United States Patent [19]

Frey et al.

[11] Patent Number: 5,708,348
[45] Date of Patent: Jan. 13, 1998

[54] METHOD AND APPARATUS FOR MONITORING BATTERY VOLTAGE

[75] Inventors: Mitchell B. Frey, Santa Barbara; Kirk L. Hobart, Goleta; Christopher A. Renick, Santa Barbara, all of Calif.

[73] Assignee: Warren Johnson, Goleta, Calif.

[21] Appl. No.: 561,034

[22] Filed: Nov. 20, 1995

[51] Int. Cl.$^6$ .......................... H01M 10/44; H01M 10/46
[52] U.S. Cl. ..................... 320/21; 320/30; 320/35; 320/39
[58] Field of Search ............... 320/20, 21, 22, 320/23, 30, 31, 32, 35, 39

[56] References Cited

U.S. PATENT DOCUMENTS

| | | | |
|---|---|---|---|
| 3,887,863 | 6/1975 | Brokaw | 323/19 |
| 3,917,990 | 11/1975 | Sherman, Jr. | 320/35 |
| 3,944,904 | 3/1976 | Hase | 320/23 |
| 4,125,802 | 11/1978 | Godard | 320/35 |
| 4,209,736 | 6/1980 | Reidenbach | 320/22 |
| 4,237,411 | 12/1980 | Köthe et al. | 320/21 |
| 4,609,860 | 9/1986 | Fasen | 320/14 |
| 4,667,143 | 5/1987 | Cooper et al. | 320/22 |
| 4,868,706 | 9/1989 | Zaderaj | 361/101 |
| 5,012,176 | 4/1991 | LaForge | 320/31 |
| 5,013,993 | 5/1991 | Bhagwat et al. | 320/35 |
| 5,055,763 | 10/1991 | Johnson et al. | 320/15 |
| 5,103,156 | 4/1992 | Jones et al. | 320/31 |
| 5,140,251 | 8/1992 | Wu | 320/31 |
| 5,319,298 | 6/1994 | Wanzong et al. | 320/22 |
| 5,321,347 | 6/1994 | Chien | 320/21 |
| 5,339,018 | 8/1994 | Brokaw | 320/35 |
| 5,376,875 | 12/1994 | Yee et al. | 320/21 |
| 5,422,559 | 6/1995 | Hall et al. | 320/21 |
| 5,444,353 | 8/1995 | Shinohara et al. | 320/39 |

Primary Examiner—Edward Tso
Attorney, Agent, or Firm—Leo F. Costello

[57] ABSTRACT

A battery monitoring method and apparatus for delivering current to a battery, particularly a lead-acid battery, in standby condition after it has been charged and in such a manner as to maintain the rated ideal charge on the battery at the ambient temperature while minimizing damage to the battery cells. In particular, the apparatus and method apply pulses of current of variable width when the battery voltage hovers about its ideal voltage, apply continuous current when the battery voltage is below its ideal voltage by a certain amount thereby to raise the voltage toward its ideal voltage, and turn off the current when the battery voltage exceeds an upper limit indicative of overcharging or when the battery voltage is at a lower limit indicative of a defective battery or reversed connections.

35 Claims, 6 Drawing Sheets

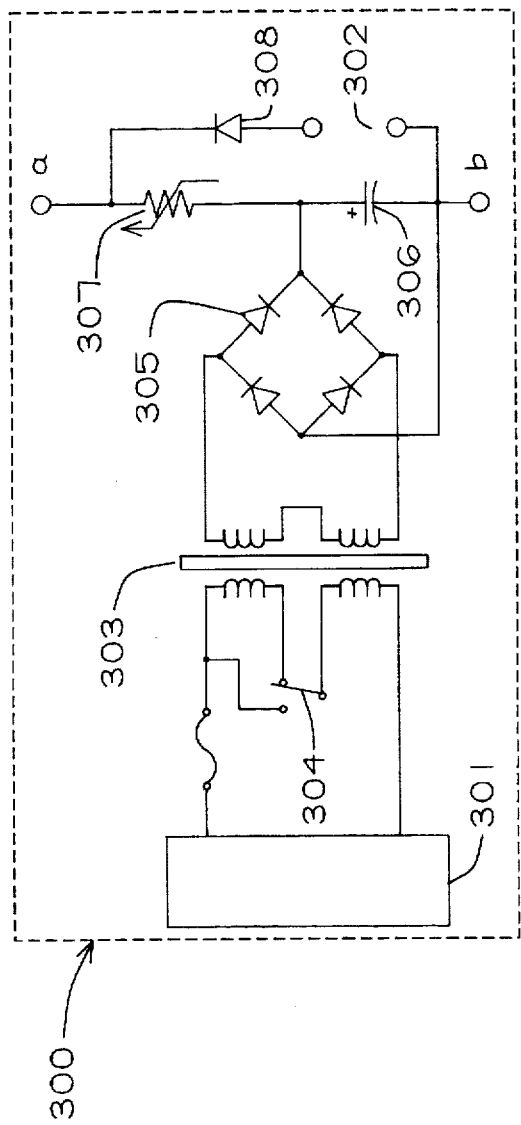
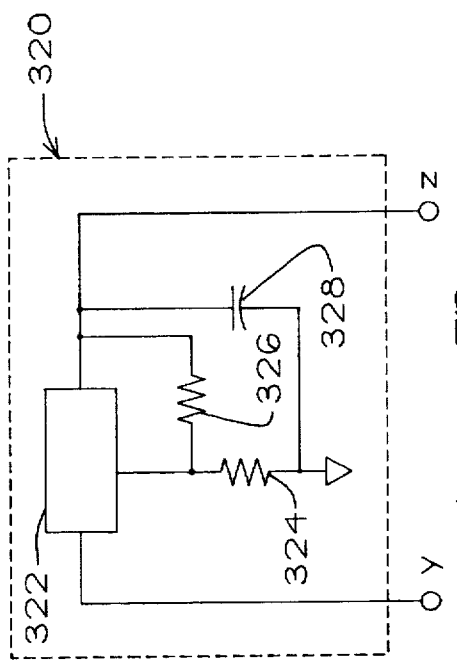
Fig. 7A
Fig. 7B

METHOD AND APPARATUS FOR MONITORING BATTERY VOLTAGE

FIELD OF THE INVENTION

This invention pertains to battery monitoring and more particularly to a method and apparatus for delivering current to a battery after it has been charged so as to maintain the charge on the battery.

BACKGROUND

There are many battery applications where a battery is required to be in a standby mode for relatively long periods interspersed with shorter periods of use. Recreational vehicles, such as motor homes, golf carts, boats, jet skis, and snow mobiles, are good examples. Also, vintage and restored automobiles, and farm and garden equipment, which sit idle for long periods are other examples. When such an equipment or vehicle is stored and not used, or not even started, for many months, its battery, usually a lead-acid battery, will discharge below its useful voltage. If a charge is not maintained on such a battery while it is on standby status, the vehicle or other equipment will not start immediately, and a charger must be located and attached, resulting in delay, frustration and annoyance.

It is of course well known that a storage battery standing off load or on open circuit will gradually discharge. Whether the battery is used infrequently as is above described and referred to as float applications, or more frequently as in so-called cyclic applications, this characteristic of self-discharge exists and must be counteracted for efficient battery use. Self-discharge may be more troublesome, however, when the battery is used infrequently since the user may forget about the battery until needed, and then upon discovering that the battery is discharged, will have to wait and delay the task at hand while the battery undergoes a charging cycle.

Moreover, even if a program of careful battery watching is followed, the battery must be constantly checked with a voltmeter, and/or a hygrometer on open lead-acid batteries, connected to a battery charger when necessary, and subsequently disconnected when the battery is charged. In certain vehicles or equipment, the battery is relatively inaccessible so that it is difficult to reach or must be removed for such checking and charging. Also, battery chargers are typically heavy, cumbersome devices which are not easily moved about and are not suited for mounting on the vehicle or equipment using the battery, nor are they intended to be connected to the battery while the battery is on load.

The commonly accepted solution for overcoming this loss of charge of a battery in standby condition is to subject the battery to a trickle or float charge, that is, a low trickle of current, at the end of a full battery charge, such as noted in the U.S. Patents to Zaderej, U.S. Pat. No. 4,868,706 and Jones, U.S. Pat. No. 5,103,156. That is, a discharged battery is first subjected to relatively high charging current to restore is the cells to their charged condition. The battery charger then reduces the current to a continuous low level of amperage, that is to a trickle, with the objective being to counterbalance the losses within the battery with a charge-sustaining current while not overcharging the battery.

Although trickle charging may be effective in keeping a standby battery in a charged condition, such a constant trickle current has a deleterious effect on battery life. Even with trickle current at a low level, for example, 5 mA, it still unduly activates the electrolyte and the reactive materials on the electrodes. This continuous activity over a long period keeps the temperature of the battery higher than is desirable and causes loss of electrolyte by dissociation and evaporation, impairment the conducting material on the electrodes, and general degradation of the cells, thereby shortening the life of the battery.

SUMMARY

The present invention pertains to battery monitoring and more particularly to a method and apparatus for delivering current to a battery, particularly a lead-acid battery, in standby condition after it has been charged and in such a manner as to maintain the rated ideal charge on the battery at the ambient temperature while minimizing damage to the battery cells. In particular, the apparatus and method apply pulses of current of variable width when the battery voltage hovers about its ideal voltage, apply continuous current when the battery voltage is below its ideal voltage by a certain amount thereby to raise the voltage toward its ideal voltage, and turn off the flow of current when the battery voltage exceeds an upper limit indicative of overcharging or when the battery voltage is at a lower limit indicative of a defective battery or reversed connections.

An object of the present invention is to deliver current to a battery, particularly a lead-acid battery, in standby condition after it has been charged and in such a manner as to maintain the rated ideal charge on the battery at the ambient temperature while minimizing damage to the battery cells.

Another object is to minimize the loss of electrolyte and conductive materials in a battery caused by a constant flow of charging current into a battery while in a standby mode.

Yet another object is to maintain the charge on a battery, especially a lead-acid battery, while avoiding trickle charging and its consequent damage to the battery cells.

Another object is to increase battery life and particularly the lives of those batteries, particularly lead-acid batteries, which remain off-load in a standby mode most of the time but which are subjected to relatively short intermittent periods of use.

Still another object is to bring up the charge and equalize it on all the cells of a lead-acid battery, thus reducing sulfation and minmizing single-cell failure.

Another object is to provide a battery monitor that senses a bad cell in an otherwise good battery and operates to bring that cell up so as to bring the entire battery up to its full charge.

A still further object is to compensate for the self-discharge of a battery which stands unused for long periods so that when the battery is to be used, it will be fully charged and ready for use and will not require a full charge.

Another object is to provide an indication to a user of the charged, charging, defective, and wrongly connected conditions of a battery being monitored.

Still another object is to provide a battery monitor which is adapted for use on batteries of various voltages and which senses the voltage of the battery being monitored.

Another object is to provide a battery monitor which has built-in protections against overloads, transient signals, reversed connections and other modes of improper hookup, and the like.

A still further object is to provide a battery monitoring apparatus which is compact, easy to install adjacent to the battery being monitored, simple to use by non-technical persons, dependable in operation, economical to manufacture.

Yet another object is to provide a battery monitor which is ideally suited for use with lead-acid batteries used on various recreational vehicles, vintage and restored vehicles, and farm and garden equipment.

Still another object is to provide a battery monitor that is capable of receiving its input voltage from various sources including conventional 115 vac, 60 Hz and DC solar sources Another object is to provide a battery monitor which can be mounted on and moved around with the battery being monitored, which has no effect on normal use of the battery under load, and which thus can remain connected to the battery terminals, and which is activated by plugging into a wall receptacle on standard line voltage when the battery is on standby status.

A feature of this invention is to control the flow of charge-sustaining current to a battery in standby condition after it has been fully charged or nearly so by limiting overcharging current, applying pulses of current to the battery when the battery voltage hovers around its rated ideal voltage at the ambient temperature, applying continuous current flow to the battery when the battery voltage is below its ideal voltage by a certain amount, and turning off the flow of current to the battery when the battery voltage is at a low level where the battery is considered defective or where the voltage is negative indicating reversed connections.

An additional feature is to supply charge-maintaining current to a battery in pulses of relatively low amperage and of variable pulse width depending on the battery voltage and when the battery voltage is very close to its rated ideal voltage, thereby to maintain a full charge on the battery and to equalize the charge among the cells of the battery while minimizing damage to the battery cells caused by trickle charging with a continuous current flow.

These and other objects will become apparent upon reference to the accompanying drawings and the following description.

DETAILED DESCRIPTION OF THE APPARATUS

Figure 1:
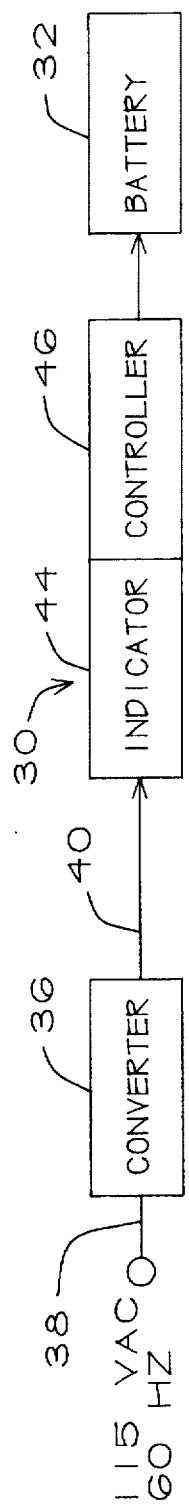
FIG. 1 is a block diagram of the battery monitor of the present invention shown connected to a battery being monitored.
Figure 2:
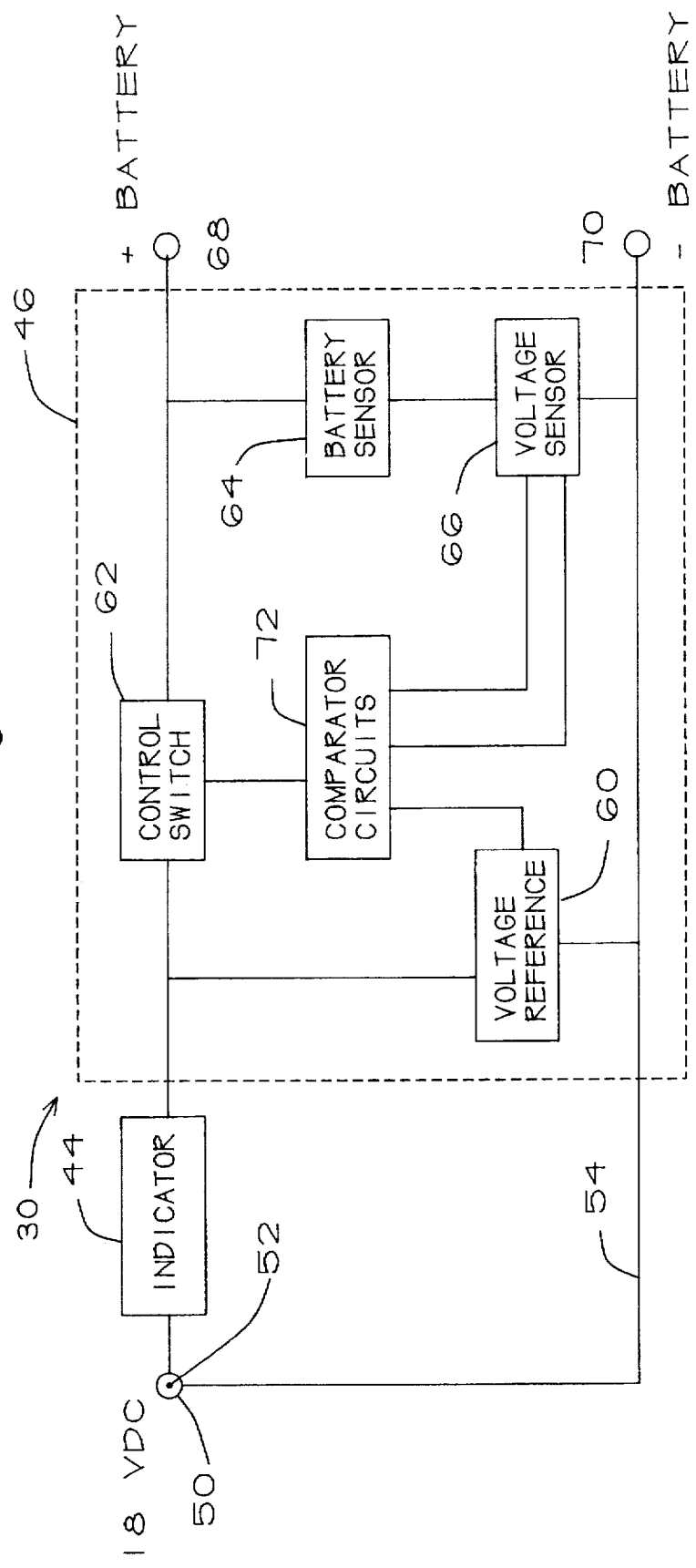
FIG. 2 is a more detailed block diagram of the monitor of FIG. 1.
Figure 3:
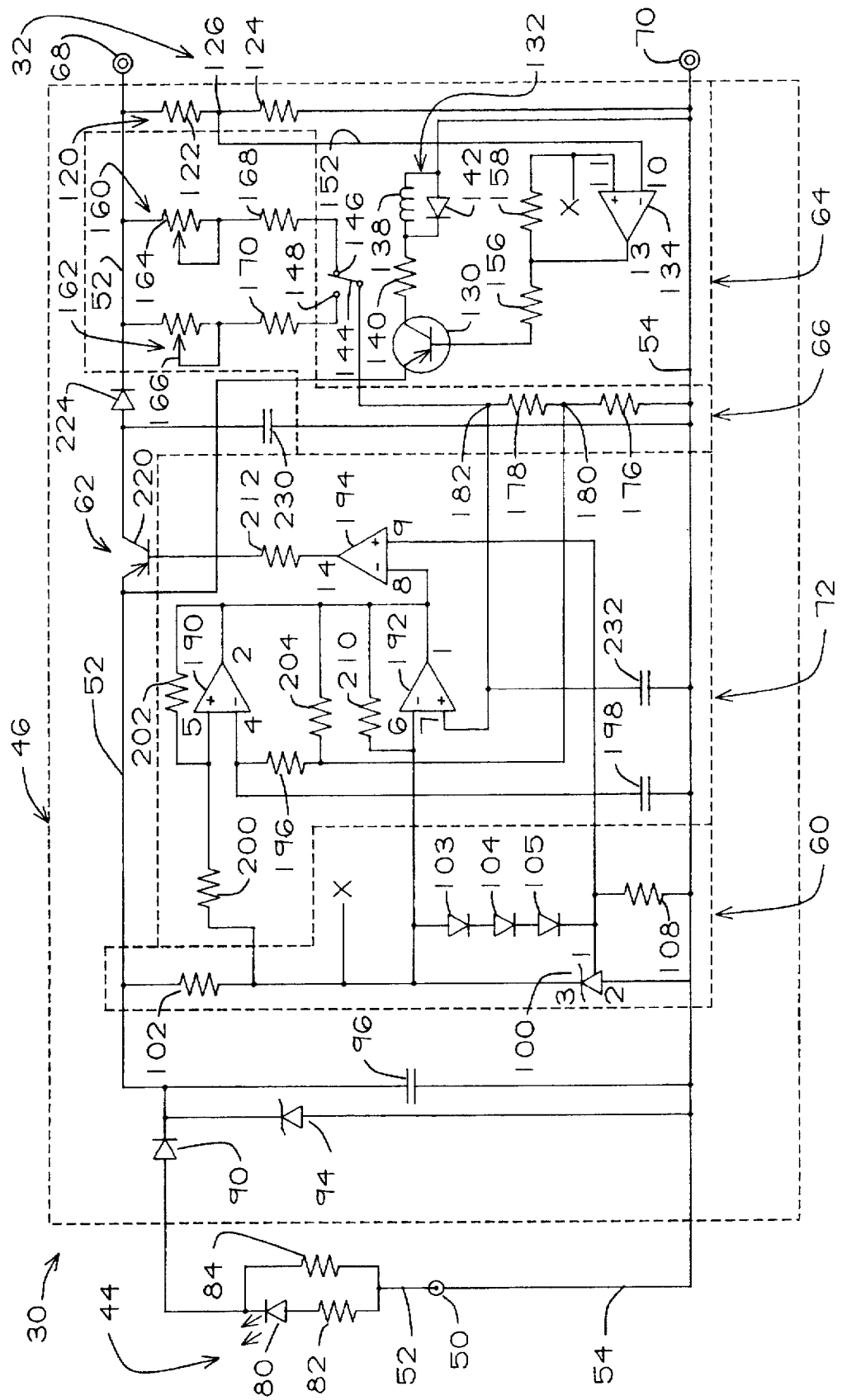
FIG. 3 is a circuit diagram of a 6/12 volt embodiment of the battery monitoring apparatus of the present invention.

A battery monitor or apparatus incorporating the principles of the present invention is indicated by the numeral 30 in FIGS. 1, 2 and 3 of the accompanying drawings. The monitor is shown connected to a battery 32 which may be a lead-acid battery, either an open or flooded lead-acid battery or a sealed lead-acid battery. Although the principles of the present invention are adaptable to batteries of various voltages, the embodiments shown and described herein pertain to the common battery voltages of 6 volts, 12 volts, and 24 volts. More particularly, the embodiment shown in FIGS. 1–6 is a 6 volt/12 volt battery monitor but will be described for use with a 12 volt battery, it being understood that the principles of the present invention apply equally as well to a 6-volt or 24-volt battery or batteries of other capacities. The embodiment of FIGS. 7, 7A and 7B is a 12 volt/24 volt battery monitor.

The monitor 30 (FIGS. 1–3) includes a voltage converter or adapter 36 having a plug represented by the line 38 to be connected to a common 115 v.a.c., 60 Hz outlet receptacle and a low-voltage outlet wire and jack represented by the numeral 40. The converter reduces the line voltage to 18 v.d.c. at from 250 to 300 mA. The monitor also includes an indicator 44 connected to the converter 36 and a controller 46 having an input connected to the indicator and an output connected to the battery 32.

The indicator 44 and the controller 46 are preferably enclosed is a common housing and physically mounted on or closely adjacent to the battery 32. The indicator includes a female input jack 50 (FIG. 2) which receives the output jack 40 of the converter 36 so as to provide the input voltage of 18 v.d.c. on positive and negative lines 52 and 54.

The controller 46 (FIG. 2) includes a voltage reference 60 connected across the positive and negative lines 52 and 54, a control switch 62 connected in the positive line 52, a battery sensor 64 and a voltage sensor 66 connected across the terminals 68 and 70 of the battery 32, and comparator circuits 72 having connections to the voltage reference, the control switch, and the voltage sensor. In general, the battery sensor senses whether the monitor is connected to a 6-volt or a 12-volt battery and adjusts the circuit components accordingly; the voltage sensor senses the voltage of the battery being monitored as it changes during charging and discharging; the voltage reference provides a temperature-dependent voltage and a fixed reference voltage; and the comparator circuits compare the sensed voltages with the voltage references and turn on and turn off the control switch to turn on and turn off the flow of current to the battery.

Reference is now made to FIG. 3 for a more detailed description of the battery monitor 30. The indicator 44 includes a light-emitting diode (LED) 80 for providing a visual indication of the status of the monitor and battery 32. The LED is connected to the positive line 52 through a current-limiting resistor 82, and a charge-current limiting resistor 84 is connected across the LED and its resistor.

With continued reference to FIG. 3, the controller 46 optionally includes a series diode 90 to provide protection from miswired wall adapters 36 which may be removed from the circuit with a jumper wire 92. A zener diode 94 and capacitor 96 are connected across the line to reduce noise spikes from the unregulated converter 36.

The voltage reference 60 of the controller 46 includes a three-terminal zener diode 100 which is a programmable shunt regulator including a fixed or constant voltage reference pin 1, a grounded pin 2, and a temperature-dependent, and thus variable, voltage reference pin 3 connected to the positive line 52 through a current-limiting resistor 102. The voltage reference also includes three temperature-sensitive diodes 103, 104, and 105 connected in series across the pins 1 and 3 of the zener diode 100. These diodes 103, 104, and 105 provide the negative temperature coefficient reference slope which approximates the energy band-gap voltage of lead-acid cells, scaled through the voltage sensor 66. Also, his voltage reference includes a bias resistor 108 connected from pin 1 to the negative line 54. With an appropriate current, for example, 2 mA, through the zener diode 100, as controlled by the resistor 102, a constant, precise voltage of 2.5 volts is developed on pin 1. The feedback loop containing the temperature-sensitive diodes 103-105 provide a reference voltage on pin 3 which varies is inversely with the ambient temperature and is adjusted in the embodiment of FIG. 3 to be 4.0 volts at room temperature.

Figure 4:
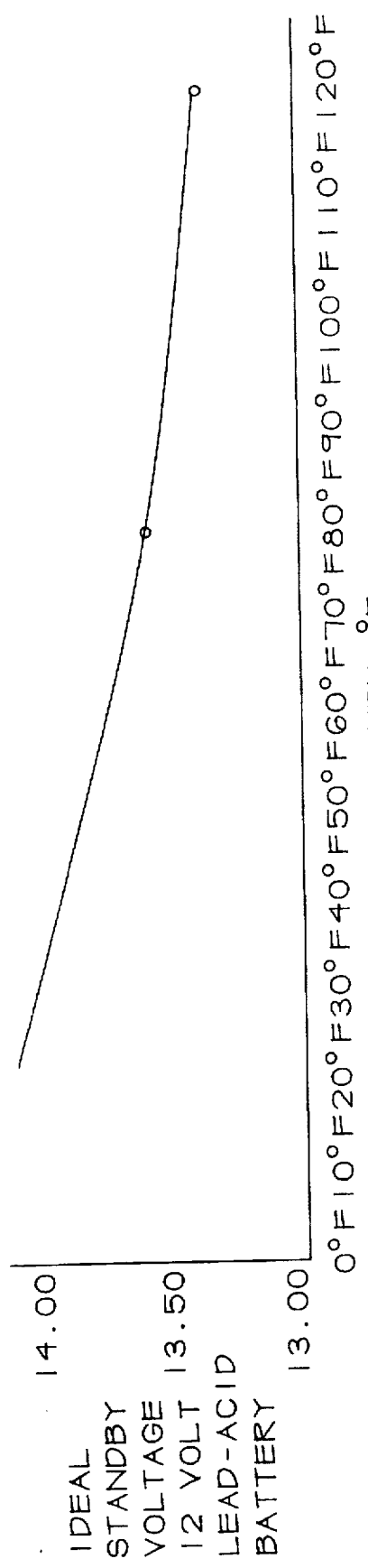
FIG. 4 is a voltage-temperature graph showing the rated, fully charged ideal voltage at various ambient temperatures of a 12 volt lead-acid battery.

With reference to FIG. 4, the rated ideal standby voltage of a 12 volt, lead-acid battery, as 32, according to the battery manufacturer, varies from 14.4 volts at 0 degrees F, through 13.5 volts at 80 degrees F to 13.2 volts at 120 degrees F. The temperature-sensitive diodes 103-105 provide a variable reference voltage on pin 3 which is nearly proportional to this ideal standby voltage of a 12-volt battery.

Referring now to FIGS. 2 and 3, the battery sensor 64 includes a battery sensing voltage divider 120 providing a pair of resistors 122 and 124 of equal value connected across the lines 52 and 54 and an intermediate voltage tap 126. The battery sensor also provides a battery-switching transistor 130, relay 132, and comparator 134. The transistor has an emitter connected to the positive line 52 on the input side of the control switch 62, a collector connected to a coil 138 of the relay through a current-limiting resistor 140, and a base connected to the battery switching comparator 134. The relay coil is connected to ground 54, and a voltage-regulating diode 142 is connected across the coil. The coil operates a switch arm 144 which moves between a 6-volt contact 146 and a 12volt contact 148.

The battery-sensing comparator 134 (FIG. 3) is part of a quad comparator, the other parts of which are described hereinafter. The battery-sensing comparator, however, includes a negative input 10 connected by lead 152 to the intermediate tap 126 on the battery-sensing voltage divider 120. This comparator also includes an output 13 connected to the base of the battery-switching transistor 130 through a current-limiting resistor 156, and in a feedback loop through resistor 158, to the positive input 11 of the comparator. This positive input is also connected to pin 3 of the voltage reference diode 100, as indicated by reference character x.

The voltage sensor 66 (FIG. 3) includes a 6-volt circuit 160 and a 12-volt circuit 162, each connected from the positive line 52 to the negative line 54 through the switching relay 132. These circuits include trimpots 164 and 166 and current-limiting resistors 168 and 170 respectively connected to the relay contacts 146 and 148. Primary and secondary sensing resistors 176 and 178 are connected in series from the common terminal of the relay switch arm 144 to the negative line 54 and provide a primary voltage tap 180 and a secondary voltage tap 182.

The resistors 168, 170, 176, and 178 (FIG. 3) in the voltage sensor circuits 160 and 162 are selected and the trimpots 164 and 166 are adjusted so the voltages at the primary and secondary taps 180 and 182 are of predetermined mounts having a relationship to the voltage of the battery 32 being monitored and scaled to match the voltage provided at pin 3 of the diode 100 of the voltage reference 60. The voltage at the primary tap is adjusted to represent the voltage of the battery 32 when it is at its rated ideal standby voltage at the ambient temperature of the battery; in the described embodiment of the subject monitor, the voltage at the primary tap is adjusted to be 4 volts when the battery voltage is 13.6 volts at 80 degrees F. The voltage at the secondary tap 182 is adjusted to be at 5.5 volts when the voltage at tap 180 is 4.0 volts. When the voltage at tap 182 drops below 4 volts, however, it represents a battery voltage below 10 volts, or a battery which is considered to be defective. It also represents a situation where the leads 52 and 54 are reversed when connected to the battery 32 producing a negative voltage at the tap 182.

The comparator circuits 72 (FIG. 3) include a primary voltage comparator 190, a secondary voltage comparator 192 and a switching voltage comparator 194. Each of these comparators is a part of the quad comparator referred to above and including the battery sensing comparator 134. The primary comparator 190 has a negative input 4 which is connected to the primary voltage tap 180 through a resistor 196 and to ground 54 through a capacitor 198. The positive input 5 of this primary comparator is connected to the voltage reference pin 3 of the voltage reference diode 100 through resistor 200. The output pin 2 of the comparator 190 is connected in a first feedback loop to the positive input 5 through resistor 202 and a second feedback loop to a point between the resistor 196 and the voltage tap 180 through resistor 204.

The output 2 of the primary comparator 190 (FIG. 3) is also connected to the output 1 of the secondary comparator 192 and to the negative input 8 of the switching comparator 194. The output 1 of the secondary comparator is also connected through a feedback resistor 210 to the negative input 6 of the secondary comparator which is also connected to pin 3 of the voltage reference diode 100. The positive input 7 of the secondary comparator is connected to the secondary voltage tap 182. The switching comparator 194 has a positive input 9 connected to pin 1 of the voltage reference diode 100 and an output 14 connected through the output resistor 212 to the control switch 62.

The control switch 62 (FIG. 3) is a transistor 220 having its base connected to the output resistor 212, its emitter connected to the positive line 52 and more specifically to the light-emitting diode 80, through the protective diode 90, and its collector connected to the positive terminal 68 of the battery 32 through a diode 224 which also provides protection from reversed battery connections. A capacitor 230 is connected across the line 52, 54, and capacitor 232 is connected from the secondary voltage tap 182 to ground, both of these capacitors being provided to reduce electrical noise that may enter by way of the battery connections at terminals 68 and 70.

OPERATION OF THE MONITOR AND DETAILED DESCRIPTION OF THE METHOD

In general, the monitor 30 (FIGS. 1-6) operates, and the method of the present invention serves, to maintain the voltage on the battery 32 within a range from an upper threshold voltage slightly above the rated ideal standby voltage of the battery to a lower threshold voltage slightly below such ideal standby voltage. In the embodiment shown and example being described, this upper threshold voltage is preferably 0.2 volts above the ideal standby voltage and the lower threshold voltage is preferably 0.2 volts below the ideal standby voltage, i.e., a range of less than 0.5 volt. Thus, with a 12-volt battery having an ideal standby voltage of 13.6 volts at 80 degrees F (FIG. 4), the upper threshold voltage is 13.8 volts and the lower threshold voltage is 13.4 volts.

The operation of the monitor 30, and the performance of the method, is such that when the battery voltage exceeds the upper threshold (FIG. 6), the monitor does not supply any current to the battery 32, but when the battery voltage is below the lower threshold, the monitor supplies full, continuous current to the battery. When the voltage of the battery is between the upper and lower thresholds, and as explained in more detail below, the monitor outputs current pulses at the rate of approximately 2 pulses per second and whose duty cycle varies from 0 percent when the battery voltage is at the upper threshold to 100 percent when the battery voltage is at the lower threshold. When the battery voltage is at a predetermined level below the lower threshold, about twenty-five percent below the lower threshold, or 10 volts in this example, indicating a bad battery or reversed connections, the monitor shuts off.

More specifically, in the preferred use of the subject battery monitor 30 (FIGS. 1–6), the indicator 44 and the controller 46 are preferably attached to the battery 32, or are very closely adjacent to the battery, with the lines 52 and 54 connected to the battery terminals 68 and 70. When the battery is in an on-load condition in a vehicle or other equipment (not shown, but which serves as the battery load), the battery is normally away from the 115 v.a.c. voltage supply so the converter 36 is disconnected from this supply. The battery monitor has no effect on the battery in its on-load condition since the diode 224 prevents reverse current flow, and the battery and voltage sensors 64 and 66 draw less current than the self-discharge current of the battery and is insignificant compared to load current.

When the vehicle or equipment is to be stored or otherwise not in use, the battery monitor 30 is employed to maintain the battery voltage at its rated standby voltage. Prior to using the monitor, however, it is desirable to bring the voltage of the battery up to its rated standby voltage by a conventional battery charger, assuming the voltage of the battery is low enough to justify such a charge. The subject monitor 30 is capable of charging a battery from a low voltage, for example from about 10–11 volts, but it will be slow since the subject monitor intentionally does not output the high current necessary for a fast full charge. The present monitor is not intended for normal full battery charging but instead is for the maintainance of a full charge once that has been obtained.

After the battery 32 is fully charged (FIGS. 1–6), the converter 36 is connected by the plug 38 to a conventional source of 115 volts v.a.c. at 60 Hz. When voltage is applied to the positive line 52, the relay 130 is conditioned to be energized in order to move the switch arm 144 from its normal position against the 6-volt contact 146 to the 12-volt contact 148 with a 12-volt battery being monitored. When the voltage on the battery is greater than 8 volts, the voltage at tap 126 will be greater than 4 volts, causing the voltage on the negative input 10 of the comparator 134 to exceed the reference voltage of 4 volts on the positive input 11. This causes the output 13 to be low thereby to turn on the transistor 130 and allow current to flow through the relay coil 138 which moves its switch arm into the 12-volt position. Assuming the battery voltage is above 10 volts and below its upper threshold voltage, as described above, the charge control transistor 220 will be turned on, in a manner explained below, so that current flows from the unregulated converter 36 output through the current-limiting resistor 84, through the protective diode 90, through the transistor 220, and through the protective diode 224 out to the battery 32 at terminal 68. The voltage developed across resistor 84 illuminates the light-emitting diode 80 through its current limiting resistor 82 thereby indicating to a user that current is being supplied to the battery.

Under these conditions (FIG. 3), the resistor 102 allows about 2 mA to the voltage reference diode 100 setting up a precise 2.5 volts on pin 1 and, through the diodes 103, 104 and 105, a reference voltage of 4 volts on pin 3 at an ambient temperature of 80° F. This then becomes the voltage reference for the battery 32 to be maintained by the battery monitor 30 at its ideal fully-charged voltage.

It is to be noted that the primary and secondary sensing resistors 176 and 178 (FIG. 3) divide the battery voltage to the same scale as the voltage reference 60. The primary comparator 190 compares the divided voltage at the primary tap 180 with the reference voltage of 4 volts at the pin 3 of the reference diode 100, it being noted that pin 3 is connected to the positive input 5 of the primary comparator. If the voltage at tap 180 and thus on the negative input 4 of the primary comparator is below 4 volts, the output 2 of this comparator goes to open-collector. This causes the resistor 210 to pull the negative input 8 of the switching comparator 194 up to 4 volts, that is the reference voltage on pin 3 of the voltage reference 100. Since the voltage on the positive input 9 of the switching comparator 194 is at a constant 2.5 volts, the voltage on the negative input 8 exceeds the voltage on the positive input causing the output 14 to go to ground which turns on the controlling transistor 220. Thus, a reduction in the battery voltage below the reference value of 4 volts, or 13.6 volts in terms of the actual battery voltage, causes current to be supplied to the battery 32 through the transistor 220.

If the battery voltage (FIG. 3) exceeds the ideal standby voltage of 13.6 volts, causing the voltage at the primary tap 180 to exceed 4.0 volts, the voltage on the negative input 4 of the primary comparator 190 exceeds the voltage on the positive input 5 causing the output 2 to go to ground. Under this condition, the voltage on the negative input 8 of the switching comparator 194 is less than the voltage on the positive input 9 causing the output 14 to go open collector thereby turning off the transistor 220 and shutting off the supply of current to the battery.

A very important feature (FIGS. 3, 5, and 6) of the present invention is the oscillation of the output of the primary comparator 190 when the voltage on the negative input 4 hovers slightly below and slightly above the voltage on the positive input 5. The resistors 196, 200, 202, and 205, plus the capacitor 198, are selected to cause this comparator to oscillate when its two inputs are nearly equal. More specifically, the resistors 200, 202, and 204 are selected to adjust the hysteresis so the upper and lower thresholds occur exactly at the ideal battery voltage plus 0.2 volts and the ideal battery voltage minus 0.2 volts, respectively. In the present embodiment, and as explained above, the upper threshold is at 13.8 volts and the lower threshold is at 13.4 volts for a 12-volt battery at 80° F. The resistor 196 and the capacitor 198 set the oscillation frequency.

Figure 6:
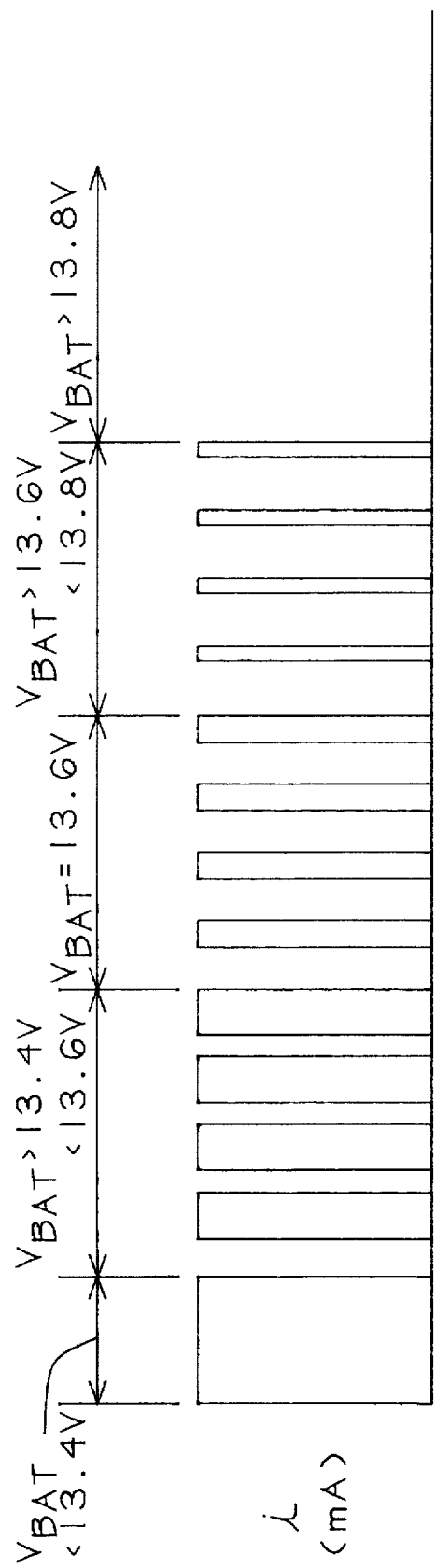
FIG. 6 is a graph of the current flow to a battery being maintained in accordance with the present invention.
Figure 7:
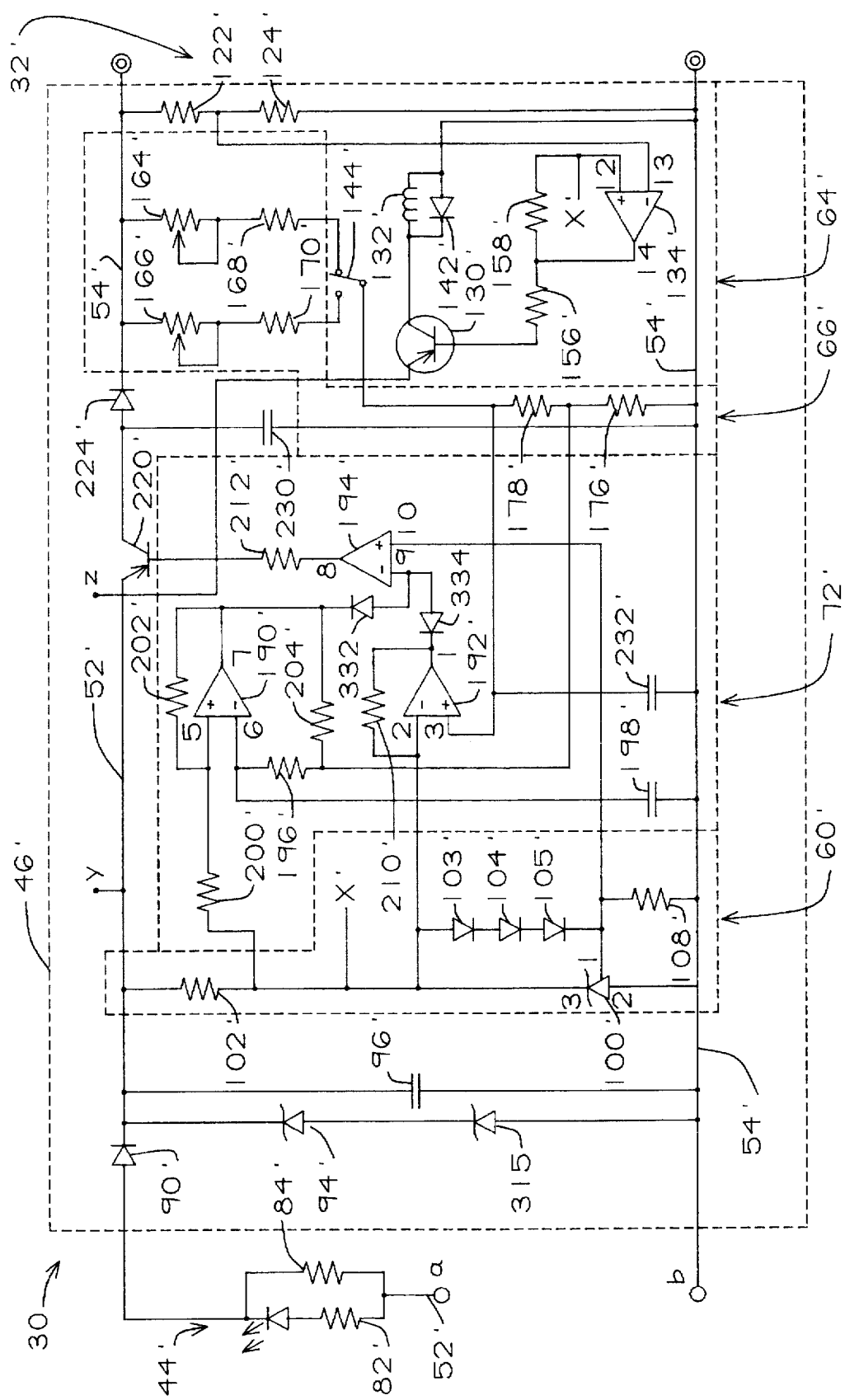
FIGS. 7, 7 A and 7 B are to be read as one circuit diagram of a 12/24 volt embodiment of the subject battery monitoring apparatus.

The result of the oscillation of the primary comparator 190 is that when the voltage on a 12-volt, lead-acid battery at room temperature is between 13.8 volts and 13.4 volts, the primary comparator 190 causes the transistor 220 to turn off and on rapidly thereby to supply current the battery in pulses (FIG. 6). As the battery voltage approaches its upper threshold, the duty cycle of the pulses decreases toward zero percent and as the battery voltage approaches its lower threshold, the duty cycle increases to 100 percent. If the battery voltage (FIG. 6) exceeds the upper threshold, that is, exceeds 13.8 volts in the example under discussion, or in other words exceeds the ideal standby voltage plus 0.2 volts, the voltage at tap 180 of the primary sensing resistor 176 will exceed the reference voltage of 4 volts by an amount sufficient to cause the transistor 220 to turn off in the manner described above. Thus, no current will flow into the battery 32, and in this manner, the battery is not overcharged. On the other hand, if the battery voltage drops below its ideal voltage minus 0.2 volts, or below 3.4 volts in the present example, the voltage on the negative input 4 of the primary comparator 190 will drop below the reference voltage of 4 volts far enough to stop the primary comparator 190 from oscillating and to place its output 2 on open collector and cause the transistor 220 to stay on thereby allowing current to flow continuously into the battery. This constant current flow will continue until the battery voltage is brought up above the lower threshold.

If the voltage across terminals 68 and 70 drops below 10 volts, which may be caused by a defective battery or by connecting the leads 52 and 54 to the wrong terminals 68 and 70, the voltage at the secondary tap 182 will drop below 4 volts causing the output 1 of the secondary comparator 192 to go to ground thereby driving the output 14 of the switching comparator 194 to open-collector, turning off the transistor 220.

An important feature of this invention is the LED 80 (FIGS. 3 and 6) which indicates the status of the monitor 30 and the battery 32 by the emitted light or lack thereof. When the battery voltage is between the upper and lower threshold voltages described above, the current will be flowing into the battery in pulses, as above explained and as illustrated in FIG. 6, thereby causing the LED to flash. This will be the normal status of the monitor with a good battery, that is, the user will observe the LED to be flashing and know that the battery is good and is being maintained in a fully charged state.

After becoming familiar with the flashing rates (FIG. 6), a user can readily detect whether the battery 32 is losing or gaining charge. As the duty cycle of the pulses moves toward zero percent, the width of the pulses and the on-time of the flashes will decrease, whereas as the duty cycle of the pulses moves toward 100 percent, the width of the pulses and the on-time of the pulses will increase. In other words the LED flashes slower when the battery is topped off and faster when the battery voltage drops toward the lower threshold. When the transistor 220 turns off, indicating the battery is above its upper threshold voltage or is below 10 volts, the LED will turn off. Ira user of the monitor observes that the light is out, an investigation will quickly reveal whether the battery is in good condition and is in an overcharge mode or whether the battery is defective. If the LED 80 shines steadily, it signals to the operator the battery voltage has dropped below its lower threshold which may mean it will just take time for the monitor to bring the voltage back up to within the threshold levels or that the battery is weak and moving toward a defective condition.

A chart is set forth below giving an example of voltages and currents in the circuit of FIG. 3 and the resulting status of the charge-control transistor 220 for the monitor 30 when monitoring a 12-volt lead-acid battery 32. This chart is based on an ideal battery voltage of 13.6 volts at 80° F. with the upper and lower thresholds are 13.8 and 13.4 volts, respectively, and the component values in the parts list below for the 6-volt/12-volt embodiment.

| TYPE | REFERENCE NOS. | VALUE | MANUFACTURER |
| --- | --- | --- | --- |
| Resistors | 102, 212 | 6.8K | All resistors are Bourns |
|  | 108, 178, 200, 210 | 22K |  |
|  | 158, 196, 202, 204 | 1M |  |
|  | 166 | 20K POT |  |
|  | 170 | 130K |  |
|  | 122, 124 | 330K |  |
|  | 168 | 27K |  |
|  | 164 | 5K POT |  |
|  | 140 | 250 ¼ W |  |
|  | 156, 176 | 68K |  |
|  | 82 | 120 1 W |  |
| Capacitors | 94, 96, 230, 234 | 0.1 µF | Thompson |
| Transistors | 220 | TIP30 | National |
|  | 130 | 2N2907A | Motorola |
| Diodes | 94 | 1N5256B | Motorola |
|  | 103, 104, 105, 142 | 1N4148 | Motorola |
|  | 90, 224 | 1N4005 | Motorola |
| Comparators | 134, 190, 192, 194 | LM2901N | National |
| IC Diode | 100 | TL431ILP | National |
| LED | 80 | T-1 ¾ Green | Lytron Devices |
| Relay | 132 | Relay SPDT 12 V | Omron |

| Vin battery 32 | i resistor 176 | v +in 192 | v −in 192 | v out 192 | v −in 190 | v +in 190 | v out 190 | v −in 194 | v +in 194 | v out 194 | on/off transistor 229 |
| --- | --- | --- | --- | --- | --- | --- | --- | --- | --- | --- | --- |
| 15.00 | 0.07 | 5.87 | 4.0 | 5 | 4.43 | 4.0 | 0 | 0 | 2.5 | H | off |
| 14.80 | 0.06 | 5.79 | 4.0 | 5 | 4.38 | 4.0 | 0 | 0 | 2.5 | H | off |
| 14.60 | 0.06 | 5.71 | 4.0 | 5 | 4.32 | 4.0 | 0 | 0 | 2.5 | H | off |
| 14.40 | 0.06 | 5.63 | 4.0 | 5 | 4.26 | 4.0 | 0 | 0 | 2.5 | H | off |
| 14.20 | 0.06 | 5.56 | 4.0 | 5 | 4.20 | 4.0 | 0 | 0 | 2.5 | H | off |
| 14.00 | 0.06 | 5.48 | 4.0 | 5 | 4.14 | 4.0 | 0 | 0 | 2.5 | H | off |
| 13.80 | 0.06 | 5.40 | 4.0 | 5 | 4.08 | 4.0 | 0 | 0 | 2.5 | H | off |
| 13.60 | 0.06 | 5.32 | 4.0 | 5 | 4.02 | 4.0 | 0 | 0 | 2.5 | L | on |
| 13.40 | 0.06 | 5.24 | 4.0 | 5 | 3.96 | 4.0 | 5 | 5 | 2.5 | L | on |
| 13.20 | 0.06 | 5.17 | 4.0 | 5 | 3.90 | 4.0 | 5 | 5 | 2.5 | L | on |
| 13.00 | 0.06 | 5.09 | 4.0 | 5 | 3.84 | 4.0 | 5 | 5 | 2.5 | L | on |
| 12.80 | 0.06 | 5.01 | 4.0 | 5 | 3.78 | 4.0 | 5 | 5 | 2.5 | L | on |
| 12.60 | 0.05 | 4.93 | 4.0 | 5 | 3.73 | 4.0 | 5 | 5 | 2.5 | L | on |
| 12.40 | 0.05 | 4.85 | 4.0 | 5 | 3.67 | 4.0 | 5 | 5 | 2.5 | L | on |
| 12.20 | 0.05 | 4.77 | 4.0 | 5 | 3.61 | 4.0 | 5 | 5 | 2.5 | L | on |
| 12.00 | 0.05 | 4.70 | 4.0 | 5 | 3.55 | 4.0 | 5 | 5 | 2.5 | L | on |
| 11.80 | 0.05 | 4.62 | 4.0 | 5 | 3.49 | 4.0 | 5 | 5 | 2.5 | L | on |
| 11.60 | 0.05 | 4.54 | 4.0 | 5 | 3.43 | 4.0 | 5 | 5 | 2.5 | L | on |

-continued

| Vin battery 32 | i resistor 176 | v +in 192 | v −in 192 | v out 192 | v −in 190 | v +in 190 | v out 190 | v −in 194 | v +in 194 | v out 194 | on/off transistor 229 |
|---|---|---|---|---|---|---|---|---|---|---|---|
| 11.40 | 0.05 | 4.46 | 4.0 | 5 | 3.37 | 4.0 | 5 | 5 | 2.5 | L | on |
| 11.20 | 0.05 | 4.38 | 4.0 | 5 | 3.31 | 4.0 | 5 | 5 | 2.5 | L | on |
| 11.00 | 0.05 | 4.30 | 4.0 | 5 | 3.25 | 4.0 | 5 | 5 | 2.5 | L | on |
| 10.80 | 0.05 | 4.23 | 4.0 | 5 | 3.19 | 4.0 | 5 | 5 | 2.5 | L | on |
| 10.60 | 0.05 | 4.15 | 4.0 | 5 | 3.13 | 4.0 | 5 | 5 | 2.5 | L | on |
| 10.40 | 0.05 | 4.07 | 4.0 | 5 | 3.07 | 4.0 | 5 | 5 | 2.5 | L | on |
| 10.20 | 0.04 | 3.99 | 4.0 | 0 | 3.02 | 4.0 | 5 | 0 | 2.5 | H | off |
| 10.00 | 0.04 | 3.91 | 4.0 | 0 | 2.96 | 4.0 | 5 | 0 | 2.5 | H | off |
| 9.80 | 0.04 | 3.83 | 4.0 | 0 | 2.90 | 4.0 | 5 | 0 | 2.5 | H | off |
| 9.60 | 0.04 | 3.76 | 4.0 | 0 | 2.84 | 4.0 | 5 | 0 | 2.5 | H | off |
| 9.40 | 0.04 | 3.68 | 4.0 | 0 | 2.78 | 4.0 | 5 | 0 | 2.5 | H | off |
| 9.20 | 0.04 | 3.60 | 4.0 | 0 | 2.72 | 4.0 | 5 | 0 | 2.5 | H | off |

Figure 5:
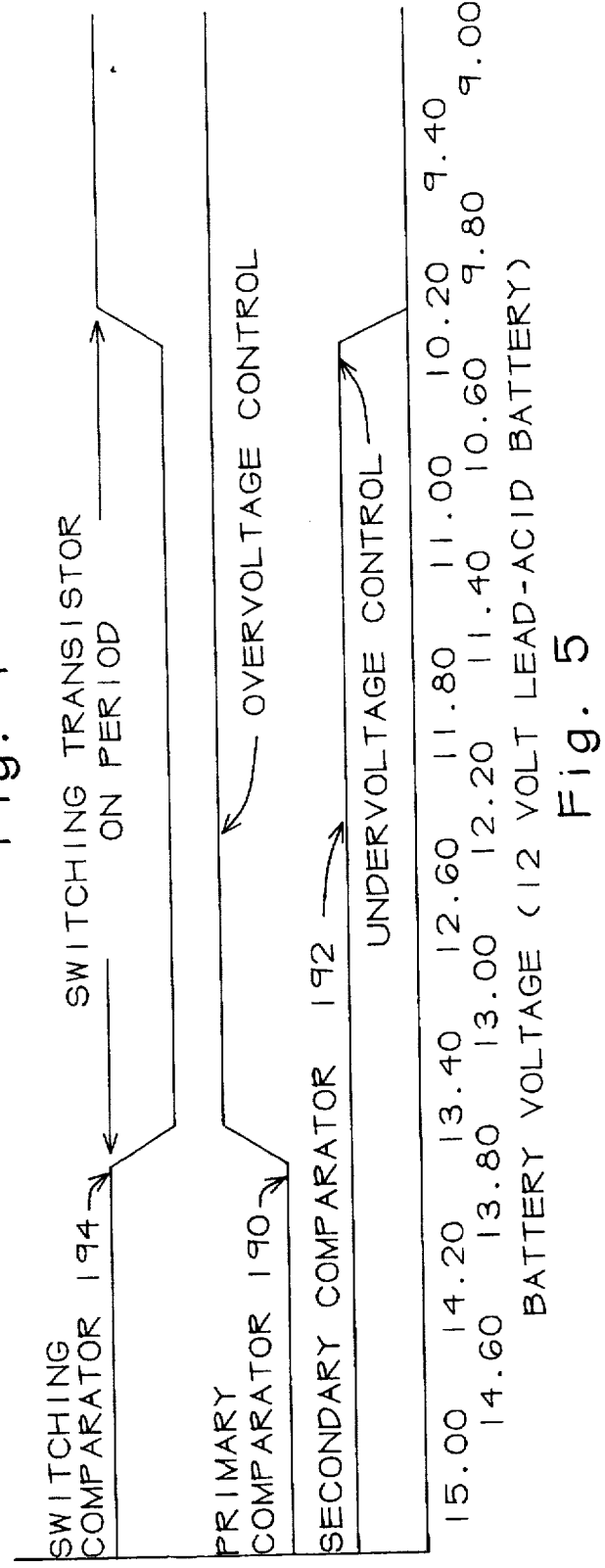
FIG. 5 is a graph showing the on-off condition of certain components used in the circuit of FIG. 3.

The on and off periods of the primary and secondary comparators 190 and 192 and the switching comparator 194 are shown in the graph of FIG. 5, which corresponds to the columns of the above chart referring to the conditions of these three comparators.

DESCRIPTION OF THE SECOND EMBODIMENT

With reference to FIGS. 7, 7A and 7B, a battery monitor 30' for both 12-and 24-volts, lead-acid batteries is illustrated. The 12/24 monitor is identical in basic principle to the 6/12 volt monitor 30 shown in FIG. 3 so common components, although perhaps of different values, are identified with same number primed but are not specifically referred herein except in the pans list. However, a few additional features are included.

Thus, the monitor 30' (FIG. 7A) includes an adapter or converter 300 which provides for a 115 v.a.c. 60 Hz AC input 301 and for a DC solar input 302. The adapter includes a transformer 303, the primary of which is connected to a relay switch arm 304 which is pan of the relay 132' in the battery sensor 64' of the 12/24 volt monitor. That is, when the battery sensor 64' senses a 24-volt battery, for example, both relay arms 144' and 304 shift to the 24-volt contacts and vice versa for the 12-volt contact. This switches the primary of the transformer between single and double windings for the 24-volt and 12-volt batteries, respectively. The secondary of this transformer is connected to a bridge rectifier 305, the positive side of which is connected to the indicator 44' via connection "a" and the negative side of which is connected to the common ground line 54 of the monitor via connection "b". The rectifier 305 converts the AC output from the transformer into a DC input for the monitor, and a filter capacitor 306 is connected to smooth the DC output voltage. In the disclosed embodiment, this DC voltage is preferably about 20 volts for monitoring a 12-volt battery and about 40 volts for monitoring a 24-volt battery.

The adapter 300 (FIG. 7A) includes several circuit protective features. A recoverable fuse-type switch 307 is inserted in the positive line from the rectifier 305 output to the indicator 44' so that if the current exceeds a predetermined maximum, this switch will open, but upon cooling the switch closes again. A diode 308 in the positive lead from the solar input 302 prevents damage to the solar input from the DC voltage out of the rectifier 305, and the rectifier itself prevents damage to the transformer 303 from the output voltage of the solar input. Also, a second diode 315 (FIG. 7) is connected in series with the diode 94' as additional protection against unwanted noise spikes from the unregulated wall adapter 300.

The 12/24 volt monitor 30'(FIG. 7B) also includes a voltage regulator 320 for controlling the voltage applied to the battery switching relay 132' (FIG. 7). Without voltage regulation, a relay suitable for monitoring a 12-volt battery 32' overheats when monitoring a 24-volt battery. Thus, the voltage regulator includes a three-terminal regulator unit 322 having an input connected to the positive line 52' at point"y", an output connected at point "y" to the battery switching transistor 130', and reference terminal. A bias resistor 324 is connected from the reference terminal to ground 54', a feedback resistor 326 is connected from the output to the reference terminal, and a filter capacitor 328 is connected from the output to ground. By adjusting the ratio of the feedback and bias resistors, a predetermined fixed voltage can be provided at the output even though the voltage at the input changes. In the disclosed embodiment, these resistors are selected to provide a fixed voltage of 12 volts at the output whether the input voltage is 20 volts or 40 volts. It is noted, however, because of the voltage regulator 320, a resistor in the place of resistor 140 in the 6/12-volt embodiment is omitted in the 12/24-volt embodiment.

In the 12-and 24-volt battery monitor 30' (FIG. 7), it is necessary to select the primary, secondary and switching comparators 190', 192', and 194' (specific comparators preferred for this embodiment are set forth in the parts list below) so that they can handle the higher voltage required for 24-volt batteries than their counterparts in the 6-and 12-volt embodiment. The outputs 1 and 7 of these higher voltage comparators have different connections internally of the comparators that must be accommodated in the 12-and 24-volt monitor. That is, the outputs 2 and 1 of the comparators 190 and 192 in the first embodiment shown in FIG. 3, have an open collector so that they can switch between open collector and ground depending on the comparison of the positive and negative inputs. However, the outputs 7 and 1 of the comparators 190' and 192' do not have an open collector but are otherwise connected within the comparator.

Thus, in the 6-and 12-volt embodiment of the monitor 30 (FIG. 3), the output 1 of the secondary comparator 192 is normally in an open collector condition so that, although the outputs 1 and 2 are directly connected together, the output 1 normally has no effect on the output 2 as the latter switches between open collector and ground. On the other hand, if the output 1 goes to ground when the voltage on the positive input of comparator 192 drops below its negative input, thereby signaling a defective battery 32 or reversed leads, the output 1 then does intentionally drive the output 2 to ground so as to shut off the power transistor 220 and prevent further battery charging.

In the 12-and 24-volt embodiment, however, if the outputs 1 and 7 were directly connected, the internal circuits of comparators 190' and 192' would have an undesirable effect on each other as the output 7 switches between high and low conditions. To prevent this undesirable interference, temperature-sensitive diodes 332 and 334 are inserted between the outputs 1 and 7 and the negative input 9 of the switching comparator 194'. Under normal monitoring conditions, the diode 334 presents an open circuit to the output 7 of the comparator 190' so the comparator 192' has no effect on the output 7. If the output 1 goes low, however, signaling a defective battery 32', the diode 334 allows conduction so as to drive input 9 low and turn off the power transistor 220'.

Following is a parts list for the principal components of the 12/24-volt monitor 30' which, as with the parts list for the 6/12-volt monitor 30, is given by way of example only and does not limit the principles of the invention.

| PART NAME | REFERENCE NOS. | VALUE | MANUFACTURER |
|---|---|---|---|
| Resistors | 102', 212' | 6.8K | All resistors are Bourns |
|  | 108', 178', 200', 210' | 22K |  |
|  | 158', 196', 202', 204' | 1M |  |
|  | 166' | 100K POT |  |
|  | 124' | 100K |  |
|  | 170' | 390K |  |
|  | 168' | 130K |  |
|  | 164' | 50K POT |  |
|  | 122' | 330K |  |
|  | 156', 176' | 68K |  |
|  | 82' | 120 1 W |  |
|  | 84' | 39 2 W |  |
|  | 140' | 2K |  |
|  | 326 | 240 |  |
| Polyswitch | 307 | 0.3A (Cap Type) | Raychem |
| Capacitors | 306 | 1000 μF | Thompson |
|  | 94', 96', 230', 234' | 0.1 μF | Thompson |
| Relay | 132' | Relay DIP-12 V | Omron |
| Transistors | 130', 220' | 2N2907A | Motorola |
| Voltage Regltr | 322 | LM317T TO-220 | National |
| Diodes | 90', 94', 103', 104', 142', 224', 308 | 1N4005 | Motorola |
|  | 94', 315 | 1N4747A | Motorola |
|  | 103', 104', 105', 142', 332, 334 | 1N4148 | Motorola |
| Comparators | 134', 190', 192', 194' | LF444A | National |
| IC Diode | 100' | TL431ILP | National |
| LED | 80' | T-1 ¾ Green | Lytron Devices |
| Transformer | 303 | Transfrmer-PL5.0-24 | TRiad |

From the foregoing, it will be understood that a method and apparatus has been provided for delivering current to a lead-acid battery 32 in standby condition after it has been charged and in such a manner as to top-off the battery and maintain its rated ideal charge regardless of temperature while minimizing damage to the battery cells. In particular, the monitor 30 or 30' and method of use apply pulses of current of variable width (FIG. 6) when the battery voltage hovers about its ideal voltage, such as 13.6 volts in the disclosed example of a 12-volt nominal voltage battery; apply continuous current when the battery voltage is below its ideal voltage by a certain amount, 0.2 volts in this example, thereby to raise the voltage toward its ideal voltage; and turn off the flow of current when the battery voltage exceeds an upper limit, 13.8 volts in this example, indicative of overcharging or when the battery voltage is at a lower limit, 10 volts in this example, indicative of a defective battery or reversed connections.

The monitor 30, or 30', brings up the charge and equalizes it in all the battery cells, thereby reducing sulfation and minimizing single-cell failure. The device senses a weak cell in the battery, causing the battery voltage to drop below the lower threshold, whereupon the LED will not flash but will shine continuously. The monitor works to bring this weak cell up to voltage and thus to top off the battery and bring the entire battery up to its fully charged voltage. No harm is caused to the battery in this action, and in most cases the battery will reach its full charge and remain there.

It is emphasized that this method and apparatus maintain the battery voltage at full charge while avoiding trickle charging and its consequent damage to the battery cells. Trickle-charging causes boiling and loss of the electrolyte and other battery materials and possible running of the battery while dry. These problems are especially aggravated in a battery that is trickle-charged in a standby mode for long periods and are avoided with the present invention. Accordingly, battery life is extended while keeping the battery at its full charge.

The monitor is adapted for use on the most commonly used lead acid batteries and is able to sense the voltage of the battery and make necessary adjustments in the circuitry. It has built-in protections against overloads, transient signals, reversed connections and other modes of improper hookup, and can be attached to a battery at all times without affecting the battery when on load. Moreover, it is readily available for connection to conventional sources of 60 Hz, 115 vac or DC solar-generated voltage.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A method for monitoring the voltage on a battery so as to supply the battery with charging current when the battery voltage is between upper and lower thresholds respectively above and below an ideal voltage for the battery, comprising:

providing a reference voltage that is related to such ideal battery voltage, establishing a voltage which represents the actual voltage of the battery being monitored, comparing the established voltage with the reference voltage, and supplying current in pulses to the battery when the established voltage is representative of a battery voltage above said lower threshold.

2. A method of maintaining the voltage on a battery within a range from an upper threshold voltage slightly above its ideal standby voltage to a lower threshold voltage slightly below its ideal standby voltage, comprising the steps of:

supplying a continuous flow of current to the battery when the battery voltage is below said lower threshold thereby to raise the battery voltage to within said range, supplying current in pulses to the battery when the battery voltage is within said range, and completely shutting off the supply of current to the battery when the battery voltage exceeds said upper threshold thereby to avoid trickle-charging of the battery.

3. The method of claim 2, including the further step of:

varying the length of the current pulses from a maximum pulse length when the battery voltage is at said lower threshold to a minimum pulse length when the battery voltage is at said upper threshold.

4. The method of claim 2 including the further step of:

stopping the flow of current to the battery when the battery voltage is lower than said lower threshold by an amount indicative of a defective battery or reversed battery connections.

5. The method of claim 2, wherein said method of maintaining the voltage on a battery is performed after the battery has been charged to its ideal standby voltage.

6. The method of claim 2, wherein the supplying step supplies current at a lower than normal battery charging amperage.

7. A method for monitoring the charge on a battery and for maintaining such charge between upper and lower threshold voltages, fully below the ideal, fully charged voltage for the battery and for shutting off charging current to the battery when the battery voltage falls below a minimum voltage less than said lower threshold and at which the battery is considered defective, comprising the steps of:

providing a reference voltage that is related to such ideal voltage, sensing the voltage of the battery being monitored to provide a sensed voltage, comparing the sensed voltage with the reference voltage to provide a first signal representing a battery voltage above said ideal voltage, a second signal representing a battery voltage below said ideal voltage, and a third signal representing a battery voltage at or below said minimum voltage, supplying current to the battery in response to said second signal but shutting off the supply of current in response to said first signal whereby current flow into the battery oscillates between on and off conditions as the battery voltage respectively falls below and rises above said ideal voltage, and shutting off the supply of current to the battery in response to the third signal.

8. A method of maintaining a charge on a battery after the battery has been charged to a voltage which is equal or close to its ideal standby voltage by controlling the supply and interruption of current flow to the battery, comprising:

providing a reference voltage that is related to such ideal voltage;

sensing the voltage of the battery to provide first and second sensed voltages representative of the actual voltage of the battery being monitored;

comparing the first sensed voltage with the reference voltage to provide first and second signals respectively depending on whether the first sensed voltage is greater or less than the reference voltage, said first and second signals respectively representing maximum and intermediate battery voltages above an upper threshold slightly greater than said ideal voltage and below a lower threshold slightly less than said ideal voltage;

comparing the second sensed voltage with the reference voltage to provide a third signal when the second sensed voltage is less than the reference voltage, said third signal representing a minimum battery voltage less than said intermediate battery voltage;

supplying current to the battery in response to said second signal;

interrupting the flow of current to the battery in response to the first and third signals, said comparing step causing an oscillation between said first and second signals when the first sensed voltage is nearly equal to the reference voltage thereby to supply current to the battery in pulses between said upper and lower thresholds.

9. A method for maintaining an ideal full charge on a lead-acid battery by supplying the battery with charging current when the battery voltage is between upper and lower threshold voltages respectively above and below said ideal charge and when the battery voltage is between the lower threshold voltage and a predetermined minimum voltage representing a defective battery or crossed wires, and so as not to supply current to the battery when the battery voltage is above the upper threshold or below the predetermined minimum, comprising:

providing a reference voltage that has a predetermined relationship to such ideal battery voltage at the ambient temperature of the battery and thereby to said upper and lower threshold voltages at such temperatures, sensing the voltage of the battery being monitored to provide a first monitoring voltage which represents the actual voltage of the battery when it is in a range from above said upper threshold voltage to said predetermined minimum voltage, sensing the voltage of the battery being monitored to provide a second monitoring voltage which represents the actual voltage of the battery below said predetermined minimum voltage, comparing the first and second monitoring voltages with the reference voltage, supplying current to the battery when said comparison with the first monitoring voltage indicates that the battery voltage is between said predetermined minimum voltage and said upper threshold voltage, and ceasing the supply of current to the battery when said comparison with the first monitoring voltage indicates that the battery voltage is above said upper threshold voltage and when said comparison with the second monitoring voltage indicates that the battery voltage is below said predetermined minimum voltage.

10. The method of claim 9, wherein said supplying step includes supplying current continuously to the battery when said comparison indicates that the battery voltage is between said predetermined minimum voltage and said lower threshold, and wherein said supplying step further includes supplying current to the battery in pulses when said comparison indicates that the battery voltage is between said lower and upper thresholds.

11. The method of claim 10, wherein said supplying step includes reducing the width of the pulses as said comparison indicates that the battery voltage is increasing from said lower threshold voltage to said upper threshold voltage and increasing the width of the pulses as said comparison indicates that the battery voltage is decreasing from said upper threshold to said lower threshold.

12. An apparatus for monitoring a battery to maintain its voltage within a range from an upper threshold voltage slightly above its ideal standby voltage and a lower threshold voltage slightly below its ideal standby voltage, comprising:

means for supplying a continuous flow of current to the battery when the battery voltage is below said lower threshold thereby to raise the battery voltage to within said range, means for supplying current in pulses to the battery when the battery voltage is within said range, and means for completely shutting off the supply of current to the battery when the battery voltage exceeds said upper threshold thereby to avoid trickle-charging of the battery.

13. The apparatus of claim 12, including:

means for varying the length of the current pulses from a maximum pulse length when the battery voltage is at said lower threshold to a minimum pulse length when the battery voltage is at said upper threshold.

14. The apparatus of claim 13 including;

means for stopping the flow of current to the battery when the battery voltage is lower than said lower threshold by an amount indicative of a defective battery or reversed battery connections.

15. The apparatus of claim 14, wherein said supplying and interrupting means includes first, second and third comparators, said third comparator including means for turning the supply of current on and off, said first comparator including means for causing the third comparator to oscillate between said on and off conditions when the battery voltage is between said upper and lower thresholds and to turn off when the battery voltage is above said upper threshold, and said second comparator including means for overriding said first comparator and disabling said third comparator when said battery voltage is lower than said predetermined amount.

16. The apparatus of claim 15, further including:

voltage reference means providing a temperature-sensitive voltage and a fixed voltage;

battery voltage sensing means for providing sensed voltages representative of the voltage of the battery being monitored, said first and second comparators being responsive to said voltage sensing means and to said temperature-sensitive voltage, said third comparator being responsive to said first and second comparators and to said fixed voltage, said sensing means also including a fourth comparator responsive to the voltage of the battery being monitored and further including means for maintaining the voltage of the sensing means at substantially the same level irrespective of the rated voltage of the battery, whereby said first and second comparators turn the third comparator on and off depending on the voltages sensed.

17. The apparatus of claim 13 including;

wherein said varying means includes means for continuously varying the duty cycle of the pulses between 0% when the sensed voltage is at the upper threshold and 100% when the sensed voltage is at the lower threshold.

18. The apparatus of claim 12, wherein the supplying means supplies current at a lower than normal battery charging amperage.

19. An apparatus for monitoring the voltage on a lead-acid battery so as to supply the battery with charging current when the battery voltage is between upper and lower threshold voltages respectively above and below an ideal voltage for the battery and when the battery voltage is between the lower threshold voltage and a predetermined minimum voltage representing a defective battery or crossed wires, and so as not to supply current to the battery when the battery voltage is above the upper threshold or below the predetermined minimum, comprising:

means for providing a temperature-dependent reference voltage that has a predetermined relationship to such ideal battery voltage and thereby to said upper and lower threshold voltages and a fixed reference voltage, first means for sensing the voltage of the battery being monitored to provide a first monitoring voltage which represents the actual voltage of the battery when it is in a range of voltages from above said upper threshold voltage to said predetermined minimum voltage, second means for sensing the voltage of the battery being monitored to provide a second monitoring voltage which represents the actual voltage of the battery below said predetermined minimum voltage, controlling comparator means responsive to the first and second sensing means for respectively comparing the first and second monitoring voltages with the temperature-dependent reference voltage to provide output signals representative of the voltages sensed, and switching comparator means responsive to the controlling comparing means for comparing said output signals with the fixed reference voltage to supply current to the battery when the first monitoring voltage is representative of a battery voltage between said upper threshold voltage and said minimum voltage, to cease the supply of current to the battery when the first monitoring voltage is representative of a battery voltage above said upper threshold voltage and to cease the supply of current to the battery when the second monitoring voltage is representative of a battery voltage below said predetermined minimum voltage.

20. The apparatus of claim 19, wherein said switching comparator means is capable of supplying current continuously to the battery when said comparison indicates that the battery voltage is between said predetermined minimum voltage and said lower threshold, and wherein said controlling comparator means provides an oscillating output which causes said switching comparator means to supply current to the battery in pulses when said comparison indicates that the battery voltage is between said lower and upper thresholds.

21. The apparatus of claim 20, wherein said switching comparator means includes means for reducing the width of the pulses as said comparison indicates that the battery voltage is increasing from said lower threshold voltage to said upper threshold voltage.

22. An apparatus for monitoring the voltage on a battery and for supplying charging current to the battery through a charging circuit so as to maintain the voltage of the battery near its ideal voltage for the temperature of the battery and as long as the battery voltage is above a defective level of voltage, comprising:

means for providing a reference voltage that has a predetermined relationship to said ideal voltage at the temperature of the battery, means for sensing the voltage of the battery being monitored to provide a sensed voltage, and means for comparing the sensed voltage with the reference voltage to control the flow of current in the charging circuit so that there is continuous current flow when the sensed voltage is under a predetermined lower threshold below the reference voltage, so that the current flows in pulses of having a decreasing duty cycle as the sensed voltage rises from said lower threshold past the reference voltage to a predetermined upper threshold above the reference voltage, and so that there is no current flow when the sensed voltage is above said upper threshold and also when the sensed voltage is at or below said defective level of voltage.

23. The apparatus of claim 22, wherein the means for providing a reference voltage provides a temperature-sensitive reference voltage and a fixed reference voltage;

wherein the sensing means includes first sensing means for providing a sensed voltage representative of the battery voltage above its defective level and second sensing means for providing a sensed voltage representative of a battery voltage at or below said defective voltage;

wherein said supplying means includes a switch having an on condition in which it conducts current to the battery and an off condition in which it blocks current flow to the battery;

wherein said comparing means includes a switching voltage comparator, a primary voltage comparator, and a secondary voltage comparator, each of said comparators having an positive input, a negative input and an output and means for providing a high signal on its output when the signal on its negative input is less than the signal on its positive input and a low signal on its output when the signal on its negative input is greater than the signal on its positive input;

wherein the negative input of the primary comparator and the positive input of the secondary comparator are respectively connected to the first and second sensing means;

wherein the positive input of the primary comparator and the negative input of the secondary comparator are connected to the temperature-sensitive voltage;

wherein the positive input of the switching comparator is connected to the fixed reference voltage; and wherein the outputs of the primary and secondary comparators are connected to the negative input of the switching comparator.

24. The apparatus of claim 23, including means for oscillating the output signal of the primary comparator between high and low signals when the signals on its inputs are nearly equal.

25. The apparatus of claim 24, wherein said secondary comparing means is capable of overriding said primary comparing means to disable said switching comparator when the battery voltage is at said predetermined minimum voltage without interfering with the oscillating means when the battery voltage is above said minimum voltage.

26. The apparatus of claim 24, wherein said oscillating means causes oscillation of said output signal when said input signal on said negative input changes in magnitude from below to above the input signal on the positive input and within a range of less than 0.5 volt on either side of the positive input.

27. The apparatus of claim 26, wherein said oscillating means causes said output signal to vary in duration from a maximum duration when the negative input signal is less than the positive input by about 0.2 volt to a minimum duration when the negative input signal is greater that the positive input by about 0.2 volt thereby to cause the current conducted through the switch to flow in pulses having a pulse width of a duration corresponding to the output signal of the primary comparator.

28. The apparatus of claim 22, including:

means for providing a signal which is illuminated in response to the current flowing through the charging circuit and which either is on continuously, pulses, or is off depending on the current flow in the charging circuit as controlled by the comparing means.

29. The apparatus of claim 22, including:

means operative with the sensing means for providing sensed voltages of batteries having different nominal rated voltages.

30. The apparatus of claim 22 in which the monitor is adapted to monitor batteries of different sizes having different voltages, further including:

means responsive to the voltage of the battery being monitored and operative with the voltage sensing means to maintain the sensed voltage at a level which enables its comparison with the reference voltage irrespective of the voltage of the battery.

31. The apparatus of claim 22, further including:

means responsive to the voltage of the battery being monitored for changing the charging voltage to be applied to the battery when current is supplied thereto.

32. The apparatus of claim 31, wherein said responsive means includes a relay, and including means for regulating the voltage applied to the relay irrespective of the charging voltage applied to the battery.

33. The apparatus of claim 23, further including:

isolating means for preventing the output of the primary comparator from affecting the output of the secondary comparator while allowing the output of the secondary comparator to affect the output of the primary comparator.

34. The apparatus of claim 33, wherein said isolating means includes diodes connected to the outputs of the primary and secondary comparators and to the negative input of the switching comparator.

35. An apparatus for monitoring the voltage on a battery so as to supply the battery with charging current when the battery voltage is between upper and lower thresholds respectively above and below an ideal voltage for the battery, comprising:

means for providing a reference voltage that is related to such ideal battery voltage, means for establishing a voltage which represents the actual voltage of the battery being monitored, means for comparing the established voltage with the reference voltage, and means for supplying current in pulses to the battery when the established voltage is representative of a battery voltage above said lower threshold.

* * * * *